United States Patent [19]
Nishi

[11] Patent Number: 5,983,842
[45] Date of Patent: Nov. 16, 1999

[54] VERTICAL EVAPORATOR

[76] Inventor: Haruo Nishi, 1-18-17 Sasaonishi, Touin-cho, Inbe-gun, Mie, Japan

[21] Appl. No.: 09/049,249

[22] Filed: Mar. 27, 1998

[51] Int. Cl.$^6$ ....................................................... F16T 1/00
[52] U.S. Cl. .............................................. 122/491; 122/34
[58] Field of Search ...................... 122/34, 491; 261/155, 261/156, 158, 159

[56] References Cited

U.S. PATENT DOCUMENTS

| | | | |
|---|---|---|---|
| Re. 26,526 | 2/1969 | Romanos | 122/34 |
| 4,375,386 | 3/1983 | Windham | 202/197 |
| 4,629,481 | 12/1986 | Echols | 122/34 |
| 5,078,976 | 1/1992 | Shibauchi et al. | 122/491 |

*Primary Examiner*—Philip H. Leung
*Assistant Examiner*—Gregory A. Wilson
*Attorney, Agent, or Firm*—Majestic, Parsons, Siebert & Hsue P.C.

[57] ABSTRACT

A vertical evaporator has an inner tube containing a heat exchanger for heating water and an outer tube which is coaxial with and surrounds the inner tube, forming a sealed system and leaving a peripheral space between the two tubes. The inner tube has bottom outlets through which steam and water droplets generated by heating water by the heat exchanger are ejected. A helical fin is attached to the outer surface of the inner tube for centrifugally separating steam and water droplets moving up inside the peripheral space as they are guided by the helical fin. The outer tube has a steam outlet at an elevated position for discharging pure steam separated from water droplets, as well as an indentation above the helical fin for collecting water droplets which are centrifugally separated from steam. A discharge pipe is provided, leading to the indentation for discharging water collected in the indentation.

8 Claims, 2 Drawing Sheets

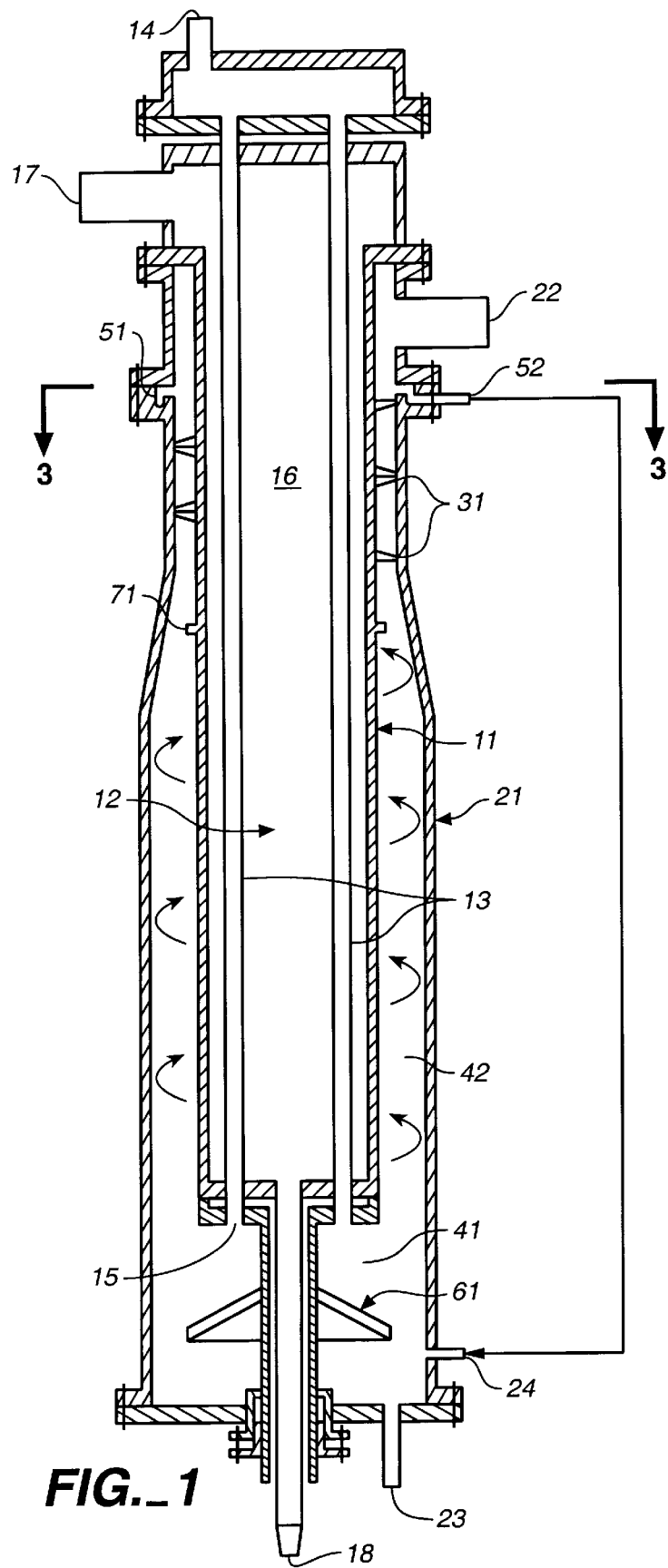
FIG._1

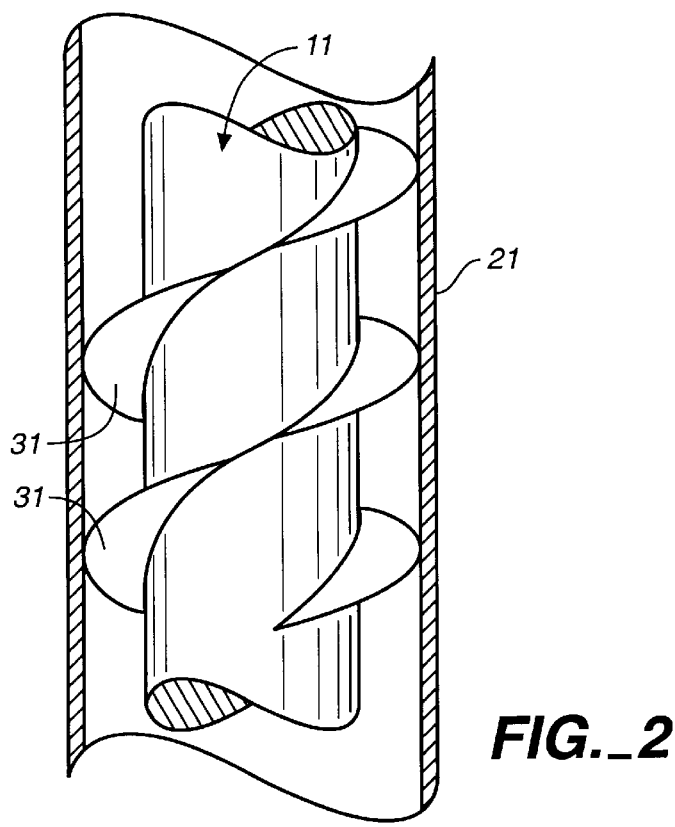
FIG._2
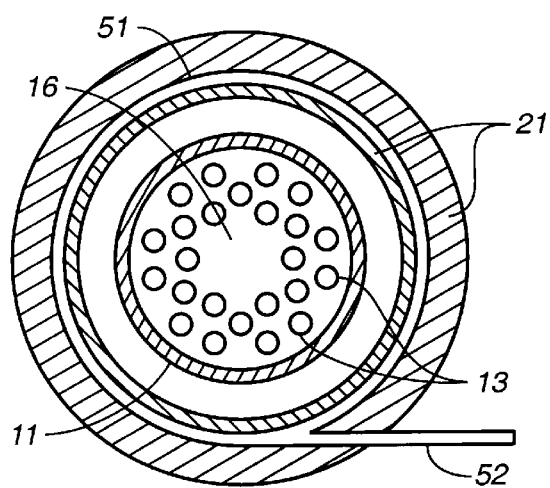
FIG._3
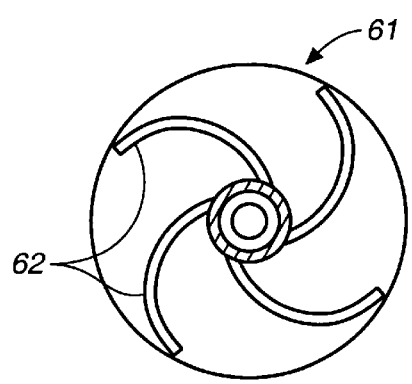
FIG._4

2

VERTICAL EVAPORATOR

BACKGROUND OF THE INVENTION

This invention relates to an evaporator of a vertical type. Highly purified distilled water and pure steam are required at production facilities of various medicaments as well as sites of medical treatments. This invention relates to an improved vertical evaporator adapted for use in connection with an apparatus for producing distilled water or a pure steam generator for the generation of pure steam.

As an example of such an evaporator, Japanese Patent Publication Tokko 57-2041 and U.S. Pat. No. 3,875,017 have disclosed a vertical evaporator comprising an inner tube containing a heat exchanger inside and having a helical flow duct on the outside and an outer tube surrounding this inner tube. Water which is supplied to the interior of the inner tube is heated by the heat exchanger, and the mixture of the pure steam thus generated by the heating and water droplets which have not evaporated is ejected from the bottom of the inner tube. While it rises through the helical flow duct, it is separated into the gas and liquid phases, and the separated water droplets are dropped from small apertures on peripheral surfaces of the duct into a narrow space formed between this helical flow duct and the outer tube, going down to the lower part of the outer tube while the separated pure steam is taken out from the top.

Such a prior art evaporator has several drawbacks. Firstly, since the inner tube having a helical flow duct on its exterior is contained inside the outer tube such that a narrow space is left between the peripheral surface of this duct and the outer tube, the overall structure is complicated, and not only is its production difficult but its maintenance is cumbersome. Secondly, since the separated water droplets are dropped from the apertures around the helical flow duct into this narrow space down to the lower part of the outer tube, dirt will tend to accumulate easily between the helical flow duct and the outer tube while its thorough cleaning is very difficult to carry out.

SUMMARY OF THE INVENTION

The problem to be overcome by the present invention is that prior art vertical evaporators are structurally complicated such that they are difficult to manufacture and their maintenance is also troublesome.

A vertical evaporator embodying this invention, with which the above and other problems of prior art evaporators can be overcome, may be characterized not only as comprising an inner tube containing therein a heat exchanger for heating water and an outer tube which is coaxial with and surrounds the inner tube, forming a sealed system and leaving a peripheral space between the two tubes, but also wherein the inner tube has bottom outlets through which steam and water droplets generated by heating water by the heat exchanger are ejected from the inner tube, and a helical fin is attached to the outer surface of the inner tube for centrifugally separating steam and water droplets moving up inside the peripheral space as they are guided by the helical fin. The outer tube has a steam outlet at an elevated position for discharging pure steam separated from water droplets, as well as an indentation above the helical fin for collecting therein water droplets which are centrifugally separated from steam. A discharge pipe is provided, leading to the indentation for discharging water collected in the indentation.

The heat exchanger may be of a so-called shell-and-tube type, and a plurality of supply tubes are contained inside the inner tube for supplying water. The inlets to these supply tubes open at the top and their outlets open at the bottom. A passage for steam is formed inside the inner tube.

Water which is supplied through the supply tubes is heated by the steam passing through the passage inside the inner tube and is evaporated in part. The mixture of pure steam thus generated by heat exchange and water droplets which have not evaporated is emitted out of the inner tube and thereafter move upward inside the peripheral space formed between the inner tube and the outer tube. The helical fin causes a spiral flow, and the droplets which are separated centrifugally are collected in the indentation formed on the peripheral inner surface of the outer tube while the separated pure steam is collected separately.

According to a preferred embodiment of the invention, the outer tube has a larger diameter below the helical fin than above the helical fin. This makes the peripheral space between the inner and outer tubes narrower as the mixture of pure steam and water droplets moves upward after emitted out of the inner tube through the outlets of the supply tubes, causing them to move faster upward and increasing the centrifugal force by which the droplets and the pure steam are separated as they spiral upward, guided by the helical fin. A conical member with strategically shaped vanes is positioned below the inner tube to provide a spiral motion to the steam and water droplets emitted from the inner tube, thereby further intensifying their spiral motion and increasing the centrifugal force by which they are separated. A water-removing member is provided on the outer peripheral surface of the inner tube and serves to prevent water droplets on the surface from continuing their upward motion and being collected with the pure steam.

Thus, a vertical evaporator according to this invention is not only structurally simple and hence easy to maintain but also capable of separating pure steam from water droplets more dependably.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a sectional horizontal view of a vertical evaporator embodying this invention;

FIG. 2 is a horizontal view of a portion of the helical fin of the evaporator of FIG. 1;

FIG. 3 is a sectional view taken along line 3—3 of FIG. 1; and

FIG. 4 is a plan view of the conically shaped member shown in FIG. 1.

DETAILED DESCRIPTION OF THE INVENTION

The invention is described next by way of an example with reference to FIGS. 1–4 wherein numeral 11 indicates an approximately cylindrical inner tube and numeral 21 indicates an outer tube. The inner tube 11 encloses therein a shell and tube heat exchanger 12 for heating supplied water, and a helical fin 31, serving as a steam separator, is attached to a portion of its outer surface. The outer tube 21 is coaxial with the inner tube 11 and is formed as a sealed system with the inner tube 11 enclosed therein. A plurality of supply tubes 13 for passing supplied water therethrough are inserted inside the inner tube 11 and are connected to an inlet 14 at the top of the inner tube 11, their outlets 15 opening to a space 41 formed between the bottom of the inner tube 11 and the bottom part of the outer tube 21. A steam passage 16 for passing steam therethrough for heating is formed inside the inner tube 11 between the supply tubes 13, and its inlet 17 is on an upper side surface of the inner tube 11. Its outlet 18, serving as the drain for the steam condensed after a heat exchange with the supplied water, is at the bottom of the outer tube 21. On an upper side surface of the outer tube 21 is a steam outlet 22 for pure stream generated from the water supplied through the supply tubes 13 by heat exchange with the steam passing through the steam passage 16. At the bottom of the outer tube 21 is an outlet 23 for the water droplets which have not evaporated, that is, the saturated water.

An indentation 51 is formed on the inner peripheral surface of the outer tube 21 above the helical fin 31 for collecting water droplets separated from steam, and a discharge tube 52 is connected to the indentation 51 for discharging the water droplets collected in the indentation 51. The downstream end of this discharge tube 52 is connected to a return opening 24 on the side surface of the outer tube 21 near its bottom. The indentation 51 is formed in the shape of a ring peripherally around the outer tube 21 and the discharge tube 52 is connected to the indentation 51 in the tangential direction, as better shown in FIG. 3. As better shown in FIG. 1, the outer tube 21 has a larger diameter below the helical fin 31.

There is also provided a conically shaped member 61 below the inner tube 21 directly below the outlets 15 of the supply tubes 13, having strategically shaped vanes 62 attached on its surface for causing a circular flow, as better shown in FIG. 4, and is attached to the outer peripheral surface of the part of the inner tube 11 in the space 41 between the outlets 15 of the supply tubes 13 and the bottom of the outer tube 21. This conically shaped member 61 serves to cause the water droplets and the vapor emitted from the outlets 15 to flow in a spiral in the same direction as the helical fin 31. On the outer peripheral surface of the inner tube 11 below the helical fin 31 is a water-removing member 71 comprising an annular piece for removing water droplets attached to the outer surface of the inner tube 11.

Inside the inner tube 11, supply water introduced through the supply tubes 13 is heated by the heat exchange with steam and the mixture of pure steam generated by this heating and water droplets which have not evaporated is caused to be emitted through the outlets 15 of the supply tubes 13 at the bottom of the inner tube 11. As the mixture collides with the conically shaped member 61 with the vanes 62 shaped as shown in FIG. 4, a spiraling upward flow is caused and the mixture of the pure steam and water droplets move up in a spiral through a peripheral space 42 formed between the inner tube 11 and the outer tube 21. During this upward motion, some of the water droplets become attached to the outer peripheral surface of the inner tube 11. The attached water will still move upwards on the outer surface of the inner tube 11 but its upward motion is stopped by the water-removing member 71. This upward spiraling motion is accelerated since the diameter of the outer tube 21 becomes smaller and hence the peripheral space 42 becomes narrower as the steam and the water droplets move upward. As the mixture is accelerated and continues to move upward spiralingly, it reaches the helical fin 31 and is further accelerated thereby. The centrifugal force of this spiraling motion causes the water droplets to separate from the pure steam. The separated water droplets are collected in the indentation 51 on the inner peripheral surface of the outer tube 21 and is discharged through the discharge tube 52. Only the pure steam, thus separated from the water droplets, continues to move further upward while spiraling inside the peripheral space 42 and is removed from the steam outlet 22.

The invention has been described above by way of only one example but this example is not intended to limit the scope of the invention. Many modifications and variations are possible within the scope of the invention. For example, an evaporator as shown in FIG. 1 need not be used singly. A plurality of similarly structured such evaporators may be connected in series. When two such evaporators are connected, for example, the inlet 14 of a first evaporator on the upstream side serves as the entrance for the saturated water discharged from the outlet 23 of the second evaporator on the downstream side, the inlet 17 of the first evaporator for heating steam becomes the inlet for pure steam taken out of the steam outlet 22 and the outlet 18 of the steam drain of the first evaporator becomes the outlet of the second evaporator for distilled water.

In summary, an evaporator embodying this invention does not simply drop the separated water droplets from small apertures in a helical flow duct through a narrow space between the duct and the outer tube. Instead, the separated water droplets are caused to move upward spiralingly and hence are subjected to a centrifugal force so as to be collected in the indentation formed on the inner peripheral surface of the outer tube. Thus, an evaporator according to this invention is structurally simpler and hence easier to maintain, and separation of water droplets from steam can be effected more dependably.

What is claimed is:

1. A vertical evaporator comprising:
   an inner tube containing therein a heat exchanger for heating water, said inner tube having bottom outlets through which steam and water droplets generated by heating water by said heat exchanger are ejected;
   an outer tube surrounding said inner tube, having a peripheral space between said outer tube and said inner tube;
   a helical fin externally attached to said inner tube for separating said steam and water droplets as said steam and said water droplets move up inside said peripheral space and guided by said helical fin, said outer tube having a steam outlet at an elevated position for discharging pure steam separated from water droplets from said outer tube, said outer tube having an indentation above said helical fin for collecting therein water droplets which are centrifugally separated from steam; and
   a discharge pipe leading to said indentation for discharging water collected in said indentation.

2. The vertical evaporator of claim 1 wherein said outer tube has a larger diameter below said helical fin than above said helical fin.

3. The vertical evaporator of claim 2 further comprising a member disposed directly below said bottom outlets of said inner tube, said member serving to cause steam and water droplets emitted through said bottom outlets to flow upward spiraling in the same direction as said helical fin.

4. The vertical evaporator of claim 3 further comprising a water-removing member attached to said inner tube below said helical fin for removing water drops on outer surface of said inner tube.

5. The vertical evaporator of claim 2 further comprising a water-removing member attached to said inner tube below said helical fin for removing water drops on outer surface of said inner tube.

6. The vertical evaporator of claim 1 further comprising a member disposed directly below said bottom outlets of said inner tube, said member serving to cause steam and water droplets emitted through said bottom outlets to flow upward spiraling in the same direction as said helical fin.

7. The vertical evaporator of claim 6 further comprising a water-removing member attached to said inner tube below said helical fin for removing water drops on outer surface of said inner tube.

8. The vertical evaporator of claim 1 further comprising a water-removing member attached to said inner tube below said helical fin for removing water drops on outer surface of said inner tube.

* * * * *